(12) United States Patent
Tian

(10) Patent No.: US 8,239,876 B2
(45) Date of Patent: Aug. 7, 2012

(54) EFFICIENT WEB SERVICES APPLICATION STATUS SELF-CONTROL SYSTEM ON IMAGE-FORMING DEVICE

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 971 days.

(21) Appl. No.: 11/818,013

(22) Filed: Jun. 12, 2007

(65) Prior Publication Data
US 2008/0313649 A1 Dec. 18, 2008

(51) Int. Cl.
- G06F 3/00 (2006.01)
- G06F 9/44 (2006.01)
- G06F 9/46 (2006.01)
- G06F 13/00 (2006.01)
- G06F 15/16 (2006.01)
- G06F 15/167 (2006.01)
- G06F 15/177 (2006.01)
- G06F 15/173 (2006.01)
- H04N 1/00 (2006.01)
- H04N 1/40 (2006.01)

(52) U.S. Cl. ........ 719/315; 709/213; 709/217; 709/226; 358/400; 358/405; 358/444

(58) Field of Classification Search .................. None
See application file for complete search history.

(56) References Cited

U.S. PATENT DOCUMENTS

| | | | |
|---|---|---|---|
| 5,452,452 A | 9/1995 | Gaetner et al. | |
| 5,867,735 A | 2/1999 | Zuravleff et al. | |
| 6,405,310 B1 | 6/2002 | Simpson | |
| 6,421,354 B1 | 7/2002 | Godlewski | |
| 6,449,657 B2 | 9/2002 | Stanbach et al. | |
| 6,483,805 B1 | 11/2002 | Davies et al. | |
| 6,502,128 B1 | 12/2002 | Kumpf | |
| 6,631,407 B1 | 10/2003 | Mukaiyama et al. | |

(Continued)

FOREIGN PATENT DOCUMENTS
EP 1 809 004 A2 7/2007
(Continued)

OTHER PUBLICATIONS
Jennie Hansen, Distributed Largest-First Algorithm for Graph Coloring, Springer-Verlag, Berlin Heidelberg, 2004.*

(Continued)

*Primary Examiner* — Andy Ho
*Assistant Examiner* — Craig Dorais
(74) *Attorney, Agent, or Firm* — Hickman Palermo Truong Becker Bingham Wong LLP; Edward A. Becker

(57) ABSTRACT

Techniques and systems for controlling resources used by a device's web services applications are disclosed. In one technique, web services applications release their allocated resources and enter a "sleep mode" after being inactive for a specified period of time. In one technique, a device maintains a shared pool of memory resources. The pool contains data structures that web services applications are likely to re-use. Before allocating a new instance of a needed data structure from free memory, a web services application first determines whether the shared pool already contains a currently unused but allocated instance of a data structure of the needed type, and, if the shared pool does, then the web service application uses that instance, overwriting existing data in the instance as needed. Web services applications return such data structures to the shared pool when those web services applications are finished using those data structures.

18 Claims, 3 Drawing Sheets

U.S. PATENT DOCUMENTS

| | | | |
|---|---|---|---|
| 6,633,874 B1 * | 10/2003 | Nusbickel | 1/1 |
| 6,718,378 B1 | 4/2004 | Machida | |
| 6,734,985 B1 | 5/2004 | Ochiai | |
| 6,842,898 B1 | 1/2005 | Carlson et al. | |
| 6,873,427 B1 | 3/2005 | Matsuda et al. | |
| 7,065,556 B1 | 6/2006 | Hickey et al. | |
| 7,072,987 B2 | 7/2006 | Jurisch et al. | |
| 7,127,700 B2 | 10/2006 | Large | |
| 7,191,446 B2 * | 3/2007 | Kosanovic | 718/104 |
| 7,373,422 B1 | 5/2008 | Paul et al. | |
| 7,430,670 B1 | 9/2008 | Horning et al. | |
| 7,433,873 B2 | 10/2008 | Kang | |
| 7,467,384 B2 | 12/2008 | Brubacher et al. | |
| 7,567,360 B2 | 7/2009 | Takahashi et al. | |
| 7,633,644 B2 | 12/2009 | Lum et al. | |
| 7,765,248 B2 | 7/2010 | Kanasaki | |
| 7,856,638 B2 | 12/2010 | Kaneda | |
| 2002/0129110 A1 | 9/2002 | Liu et al. | |
| 2003/0110242 A1 | 6/2003 | Brown et al. | |
| 2003/0182347 A1 | 9/2003 | Dehlinger | |
| 2003/0187995 A1 | 10/2003 | Fok et al. | |
| 2003/0193685 A1 | 10/2003 | Kageyama | |
| 2003/0225894 A1 | 12/2003 | Ito | |
| 2004/0055002 A1 | 3/2004 | Das | |
| 2004/0111506 A1 | 6/2004 | Kundu et al. | |
| 2004/0111709 A1 | 6/2004 | Furst et al. | |
| 2004/0121789 A1 | 6/2004 | Lindsey | |
| 2004/0128558 A1 * | 7/2004 | Barrett | 713/202 |
| 2004/0143671 A1 | 7/2004 | Idnani | |
| 2004/0226029 A1 | 11/2004 | Gelme | |
| 2004/0236829 A1 | 11/2004 | Xu et al. | |
| 2004/0249911 A1 | 12/2004 | Alkhatib et al. | |
| 2004/0267876 A1 | 12/2004 | Kakivaya et al. | |
| 2005/0021728 A1 | 1/2005 | Sugimoto | |
| 2005/0038708 A1 | 2/2005 | Wu | |
| 2005/0060431 A1 | 3/2005 | Lewontin | |
| 2005/0063003 A1 | 3/2005 | Mishima et al. | |
| 2005/0071507 A1 | 3/2005 | Ferlitsch | |
| 2005/0086330 A1 | 4/2005 | Perham et al. | |
| 2005/0138065 A1 | 6/2005 | Ciriza | |
| 2005/0144218 A1 * | 6/2005 | Heintz | 709/202 |
| 2005/0182843 A1 | 8/2005 | Reistad et al. | |
| 2005/0246428 A1 | 11/2005 | Araumi | |
| 2006/0031395 A1 | 2/2006 | Kumagawa et al. | |
| 2006/0077454 A1 | 4/2006 | Lum et al. | |
| 2006/0095541 A1 | 5/2006 | Sojian et al. | |
| 2006/0117084 A1 | 6/2006 | Morozumi et al. | |
| 2006/0158676 A1 | 7/2006 | Hamada | |
| 2006/0174026 A1 | 8/2006 | Robinson et al. | |
| 2006/0190580 A1 | 8/2006 | Shu et al. | |
| 2006/0256392 A1 | 11/2006 | Van Hoof et al. | |
| 2007/0073865 A1 | 3/2007 | Motoyama et al. | |
| 2007/0083618 A1 | 4/2007 | Kim | |
| 2007/0083679 A1 | 4/2007 | Kikuchi | |
| 2007/0086430 A1 | 4/2007 | Kemp | |
| 2007/0118642 A1 | 5/2007 | Kumbalimutt | |
| 2007/0220142 A1 | 9/2007 | Moorer et al. | |
| 2008/0027988 A1 | 1/2008 | Regnier | |
| 2008/0147886 A1 | 6/2008 | Ferlitsch | |
| 2009/0271501 A1 | 10/2009 | Shenfield et al. | |

FOREIGN PATENT DOCUMENTS

| | | |
|---|---|---|
| JP | 2000-215099 | 8/2000 |
| JP | 2004-507818 | 3/2004 |
| JP | 2004-114674 | 4/2004 |
| JP | 2005339520 (A) | 12/2005 |
| JP | 2006295883 | 10/2006 |
| KR | 2004000697 A | 1/2004 |

OTHER PUBLICATIONS

U.S. Appl. No. 11/641,454, filed Dec. 18, 2006, Office Action, Feb. 19, 2010.

U.S. Appl. No. 11/652,179, filed Jan. 10, 2007, Office Action, Apr. 12, 2010.

U.S. Appl. No. 11/641,355, filed Dec. 18, 2006, Office Action, Apr. 13, 2010.

The Patent Office of the People's Republic of China, "The First Office Action", application No. 200610137667.1, dated Feb. 6, 2009, 7 pages. (Un-translated OA provided as well, 6 pages.).

European Patent Office, "European Search Report", application No. EP 08165235, dated Mar. 25, 2009, 8 pages.

Quiroz, Andres, et al., "Design and Implementation of a Distributed Content-based Notification Broker for WS-Notification", XP-002519356, IEEE, 2006, 8 pages.

Vinoski, Steve, "Web Services Notifications", Toward Integration, XP-002519355, IEEE Computer Society, 2004, 6 pages.

Box, Don, et al., "Web Services Eventing (WS-Eventing)", XP-002519357, Aug. 2004, 38 pages.

Jammes, F. et al., "Service-Oriented Device Communications Using the *Devices Profile for Web Services*" MPAC (Dec. 2, 2005) 8 pages.

Jammes, Francois et al., "Service oriented device communications using the devices profile for Web services", ACM 2005, 8 pages.

Stal, Michael, "Web Services: beyond component-based computing", ACM Oct. 2002, vol. 45, No. 10, pp. 71-76.

U.S. Appl. No. 11/641,366, filed Dec. 18, 2006, Office Action, Jun. 30, 2010.

U.S. Appl. No. 11/641,454, filed Dec. 18, 2006, Final Office Action, Aug. 3, 2010.

European Communication received in Application No. 07252034.9 dated Nov. 5, 2010 (11 pages).

D1: Ekanayake, J. et al., "Common Architecture for Functional Extensions on Top of Apache Axis 2" XP002455230, Apr. 24, 2006 (6 pages).

D2: Anonymous, "Axis2 Architecture guide" Internet Article, XP002455231, Apr. 7, 2006 (12 pages).

D4: Buschmann, F. et al., "Pattern-Oriented Software Architecture," XP002455240, 1996 (10 pages).

D4: Ivens, K. et al., "Windows 2000: The Complete Reference" 2000, 15 pages.

Herriot et al., "Internet Printing Protocol (IPP): Event Notifications and Subscriptions", Mar. 2005, Xerox Corp., Request for Comments: 3995, pp. 1-95.

Seely Scott, "Understanding WS-Security" Web Services Specifications, Microsoft Corporation, Dated Oct. 2002, 12 pages.

Alexander et al., "Web Services Transfer (WS-Transfer)", W3C Member Submission, Dated Sep. 27, 2006, 24 pages.

Web Services Security, "SOAP Message Security 1.1 (WS-Security 2004)", OASIS Standard Specification, Dated Feb. 1, 2006, 76 pages.

U.S. Appl. No. 11/863,153, filed Sep. 27, 2007, Final Office Action, Oct. 11, 2011.

U.S. Appl. No. 11/641,366, filed Dec. 18, 2006, Final Office Action, Sep. 7, 2011.

U.S. Appl. No. 11/641,366, filed Dec. 18, 2006, Notice of Allowance, Oct. 21, 2011.

U.S. Appl. No. 11/644,181, filed Dec. 21, 2006, Notice of Allowance, Oct. 12, 2011.

U.S. Appl. No. 11/652,179, filed Jan. 10, 2007, Office Action, Jan. 31, 2012.

U.S. Appl. No. 11/644,181, filed Dec. 21, 2006, Final Office Action, Jun. 30, 2011.

* cited by examiner

EFFICIENT WEB SERVICES APPLICATION STATUS SELF-CONTROL SYSTEM ON IMAGE-FORMING DEVICE

CROSS-REFERENCE TO RELATED APPLICATIONS

This application is related to the following U.S. Patent Applications and U.S. Patents, the contents of each of which are incorporated by reference for all purposes as though fully disclosed herein: U.S. Pat. No. 7,590,661 titled "ADVANCED WEB SERVICES ON A LEGACY PLATFORM;" and U.S. patent application Ser. No. 11/644,181, titled "MULTI-THREADED DEVICE AND FACILITY MANAGER."

FIELD OF THE INVENTION

The invention relates to image-forming devices such as printing devices, and more specifically, to systems and techniques for controlling the resources used by web services applications on such devices.

BACKGROUND OF THE INVENTION

Printing devices are devices that can print viewable content on physical media, such as paper or transparent sheets. Printing devices include printers and multi-function peripherals (MFPs) such as the Ricoh Aficio 5560 system. Typically, a printing device receives data from a computer via a network or cable. The printing device prints text and/or images that are represented by the data. Image-forming devices include printing devices and other devices that can form stored images, such as scanners and cameras.

Different printing devices may offer different features. Different printing devices may have different characteristics and capabilities. It is often useful for a client, such as an application program (e.g., a word processor) or print driver, to be able to obtain information about a printing device with which that client intends to interact. For example, if a printing device can print in either black and white or in color, then it may be useful for a client to know that the printing device has such a capability. Knowing that a printing device has the ability to print in color might influence the kind of commands that the client sends to the printing device.

In order to enable clients to learn the features, characteristics, and capabilities of a printing device, some printing devices store (e.g., in volatile or non-volatile memory) metadata that indicates features, characteristics, and capabilities of those printing devices. A client can send, to such a printing device, a request for that printing device's metadata. The printing device can receive such a request and respond to the request by sending, to the client, the printing device's metadata (or a specifically requested portion thereof). The client can receive the metadata and use the metadata to customize the manner in which the client interacts with the printing device. Thus, a client can automatically learn about a printing device's features, characteristics, and capabilities.

A device's metadata might indicate information such as the device's manufacturer, the device's model, the device's Internet Protocol (IP) address(es), details about the device's configuration, etc. Under some circumstances, a client might be unable to interact in a desired manner with a printing device until the client has obtained at least some of the printing device's metadata.

In order to standardize communications between clients and devices, some devices now implement web services applications. Web services applications execute on a printing device and perform specific tasks. For example, one web services application on an MFP might perform printing tasks, while another web services application on that MFP might perform scanning tasks, while yet another web services application on that MFP might perform facsimile ("fax") tasks. Web services applications and clients communicate with each other according to one or more web services protocols. For example, in order to obtain information about an MFP's printing capabilities, or to make use of those printing capabilities, a client might send, to the MFP's "print" web services application, an inquiry or command that is formatted according to a particular web service protocol.

Web services protocols are defined by the World Wide Web Consortium ("W3C"). W3C is an international consortium where member organizations, a full-time staff, and the public work together to develop standards for the World Wide Web and the Internet. The W3C defines a "web service" as a software system that is designed to support interoperable machine-to-machine interaction over a network. This definition encompasses many different systems, but in common usage, the term refers to those services that use SOAP-formatted Extensible Markup Language ("XML") envelopes and that have their interfaces described by Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks. The specifications that define web services are intentionally modular, and, as a result, there is no one document that defines all web services. Instead, there are a few core specifications that are supplemented by other specifications as the circumstances and choice of technology dictate. The most common core specifications are SOAP, WSDL, WS-Security, and WS-ReliableExchange. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example. WSDL is an XML format that allows web service interfaces to be described along with the details of those interfaces' bindings to specific protocols. WSDL is typically used to generate server and client code, and for configuration. WS-Security defines how to use XML encryption and XML signature in SOAP to secure message exchanges. WS-ReliableExchange is a protocol for reliable messaging between two web services.

Printing devices on which web services applications execute are often highly constrained in terms of resources such as memory and network bandwidth. Vendors constrain printing devices' resources in order to make the costs of the printing devices reasonable and competitive in consumers' eyes. Unfortunately, web services applications are relatively large consumers of these limited resources. The strain that web services applications put on printing devices' limited resources has been exacerbated recently by the proliferation of web services applications on such printing devices. Web services applications have especially proliferated in response to an industry effort to maintain backward compatibility with existing clients, as is discussed below.

As web services standards evolve, newer clients expect to be able to communicate with new printing devices using the newer and better protocols that are specified by those web services standards. However, at the same time, older clients, which were able to communicate with a vendor's old printing devices using older protocols that were specified by older web services standards, usually need to be able to continue to communicate with the vendor's new printing devices using those older protocols; the vendor's customers cannot be expected to upgrade all of their clients every time that a new web services standard becomes available. To serve the needs of diverse customers and those customers' clients of varying age and capability, vendors find themselves installing, on printing devices, multiple different versions of each specialized web service application. For example, a vendor might install, on its printing device multiple different versions of a "print" web services application, multiple different versions of a "scan" web services application, and multiple different versions of a "fax" web services application. When all of these web services applications execute concurrently, a large segments of the printing device's resources may be consumed. If the resource consumption is too great, then the printing device's performance can suffer as a result.

Based on the foregoing, there is a need to control, more efficiently, resources that are used by web services applications that execute on a printing device.

SUMMARY OF THE INVENTION

Methods and systems for efficiently managing and controlling a device's resources (e.g., memory) used by web services applications that execute on that device are disclosed. In one embodiment of the invention, web services applications release their allocated resources and enter a "sleep mode" after those web services application have been inactive for a specified period of time. This allows other, more active web services applications to make use of those resources. Overall web service application performance increases as a result.

Additionally, in one embodiment of the invention, a shared pool of memory resources is maintained on such a device. The shared pool contains a limited supply of data structures that web services applications are likely to re-use. In such an embodiment of the invention, before allocating a new instance of a needed data structure from free memory, a web services application first determines whether the shared pool already contains a currently unused but allocated instance of a data structure of the needed type, and, if the shared pool does, then the web service application uses that instance, overwriting existing data in the instance as needed. Web services applications return such data structures to the shared pool when those web services applications are finished using those data structures. Thus, excessive allocation and de-allocation operations are avoided. Overall web service application performance increases as a result.

DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION OF THE INVENTION

Figure 1:
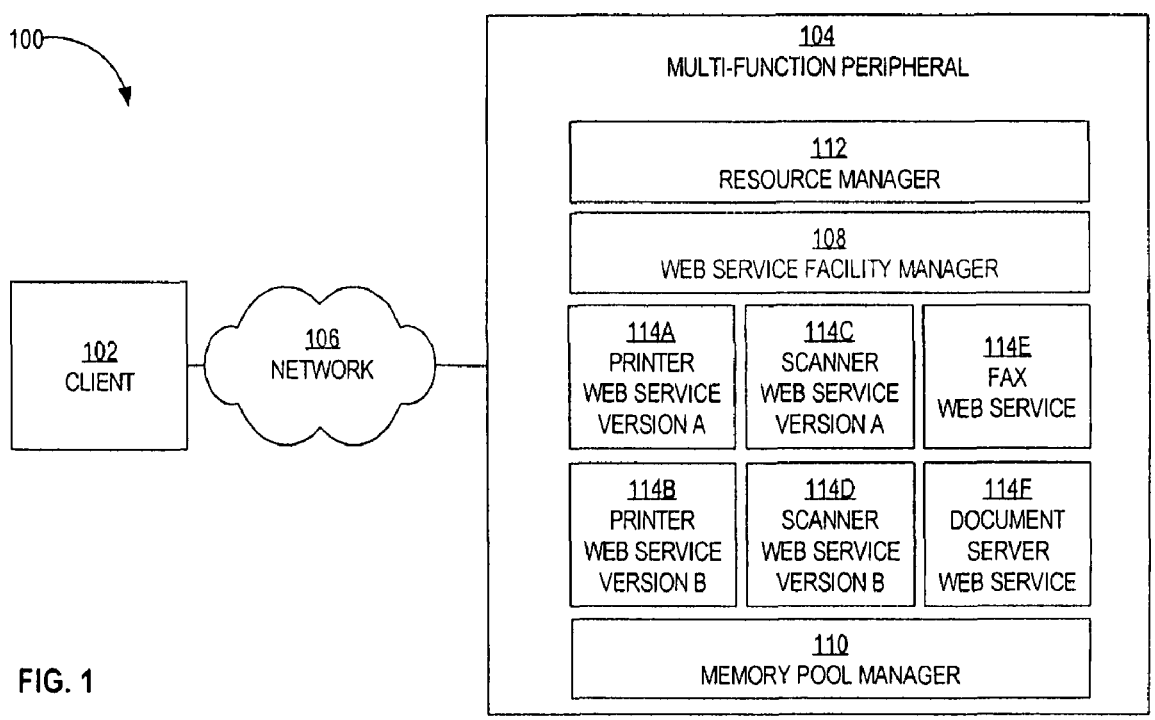
FIG. 1 is a block diagram that illustrates an example system for managing device resources for web services applications, according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

Overview

According to one embodiment of the invention, each web services application that executes on a printing device (or other device) is configured to enter a "sleep mode" after that web services application has been idle for a specified period of time. For example, if a web services application has been executing for ten minutes without receiving any communications (either from device-external clients or device-internal processes), then the web services application may voluntarily enter sleep mode for the benefit of the printing device.

In one embodiment of the invention, when a web services application enters the sleep mode, the web services application frees at least a portion (and potentially all) of the resources (e.g., memory, network bandwidth, TCP ports, etc.) that were formerly allocated to the web services application. The freed resources are made available to other, more active web services applications that might need those resources in order to perform their operations more efficiently. The sleeping web services application may utilize the devices' processor(s) to a minimal extent; for example, the sleeping web services application might use the device's processor(s) merely to determine, periodically, whether any request has been recently directed to the sleeping web services application. If and when a sleeping web services application determines that such a request has been directed to the sleeping web services application, the web services application exits sleep mode and re-allocates whatever portion of the devices' resources that the web services application requires to operate.

In one embodiment of the invention, data that a web services application might store (using the device's memory resources) is classified as either "cacheable" data or "non-cacheable" data. For example, any data that is unlikely to change ever, and/or any data that is likely to change only infrequently, may be classified as cacheable data. Examples of cacheable data might include metadata that indicates a device's manufacturer, a device's model, or a device's capabilities; such data is unlikely to change at all. Other examples of cacheable data might include a device's physical location, a default print ticket, and a default scan ticket; if such data changes, such data probably will not change often. In contrast, any data that is likely to change on a regular basis may be classified as non-cacheable data. Examples of non-cacheable data include operation-specific and status-specific data, such as print job-creation data, scan job-creation data, document-printing data, scan image-retrieving data, and job-cancellation data. Such non-cacheable data typically varies from device operation to device operation, and is unlikely to be needed on a long-term basis.

In one embodiment of the invention, the cacheable/non-cacheable classification scheme is used in order to manage a device's memory resources more efficiently. For example, each web services application may retain a local cache of data structures that are allocated once, populated once, and retained and used by that web services application on a long-term basis. When a web services application needs to access such a data structure, the web services application may do so quickly and efficiently because the data structure resides in the web services application's cache. The web services application does not need to take the time to re-allocate and re-populate such a data structure. Additionally, in one embodiment of the invention, cacheable data is stored in a serialized format, so that no extra memory allocation is needed to serialize the data. As a result, request response time is reduced.

In contrast, in one embodiment of the invention, data structures that are used to store non-cacheable data may be dynamically allocated and populated as needed from a shared pool of memory resources. When such a data structure is no longer needed (e.g., when the specific job or task to which the data structure's data pertained has been completed), then the data structure may be marked (e.g., using a flag) as having been "processed," and may be placed back in the shared pool for future use by the same and/or other web services applications. In one embodiment of the invention, when such a data structure is returned to the pool, the memory that was allocated to the data structure is not immediately freed; instead, a limited supply of each type of data structure (e.g., a print job structure, a scan job structure, etc.) may be maintained in the shared pool for future use. Under such circumstances, when a web service application needs to use a particular type of data structure, the web services application first determines whether a "processed" data structure of the particular type is present in the shared pool. If the particular type of data structure is available, then the web services application removes that data structure from the pool, marks the data structure as being not "processed," and overwrites any data that the data structure contained from the data structure's prior use. This spares the web services application from the burden of finding and allocating already scarce resources for a new instance of the particular data structure. In one embodiment of the invention, web services applications allocate memory for a new instance of a data structure for non-cacheable data only if the shared pool does not currently contain a "processed" data structure of the needed type.

Resource Management System

FIG. 1 is a block diagram that illustrates an example system for managing device resources for web services applications, according to an embodiment of the invention. System 100 comprises a client 102 that is coupled communicatively to multi-function peripheral ("MFP") 104 via network 106. Client 102 may be any program that communicates with and uses the services provided by MFP 104. For example, in one embodiment of the invention, client 102 is Microsoft Windows Vista. In one embodiment of the invention, MFP 104 is the Ricoh Aficio 5560 system. Although system 100 comprises MFP 104, in alternative embodiments of the invention, MFP 104 may be replaced with any image-forming device, or any device at all.

Network 106 may be a local-area network (LAN), a wide-area network (WAN), or a series of connected inter-networks such as the Internet. In one embodiment of the invention, client 102 and MFP 104 communicate with each other over network 106 using Internet Protocol (IP), Transmission Control Protocol (TCP), and/or User Datagram Protocol (UDP), for example. Client 102 and MFP 104 communicate with each other using messages that conform to various web services protocols.

MFP 104 comprises a web service facility manager 108, also called a device facility manager, or "DFM." Web service facility manager 108 is the initial point of contact with client 102. Web service facility manager 108 provides client 102 with information (e.g., IP addresses and TCP ports) needed for client 102 to communicate directly with other web services applications that execute on MFP 104. Some of these web services applications are discussed below.

MFP 104 also comprises web services applications 114A-F, which reside and execute on MFP 104. In the embodiment of the invention illustrated, web services applications 114A-F include printer web service application version A 114A, printer web service application version B 14B, scanner web service application version A 114C, scanner web service application version B 114D, fax web service application 114E, and document server web service 114F. Although web services applications 114A-F are shown in FIG. 1, alternative embodiments of the invention may include more, fewer, or different web services applications than those shown.

MFP 104 further comprises a memory pool manager 110. Memory pool manager 110 maintains a shared memory pool that can be used (in one embodiment of the invention—alternatives are described below) by all of web services applications 114A-F. Web services applications 114A-F communicate with memory pool manager 110 to create or obtain data structures that web services applications 114A-F need to perform various tasks. In one embodiment of the invention, web services applications 114A-F ask memory pool manager 110 to provide those web services applications with currently unused, but already-allocated data structures of application-specified types or sizes (e.g., in kilobytes). In response to such requests, memory pool manager 110 returns currently unused, but already-allocated data structures (or pointers thereto) that are in the shared memory pool, if such data structures of the specified types (or sizes) can be found in the shared memory pool. Alternatively, if no such data structures of the specified types (or sizes) can be found in the shared memory pool, then memory pool manager 110 allocates new data structures of the specified types (or sizes) from free memory, and returns those newly allocated data structures (or pointers thereto) to the requesting web services applications. In one embodiment of the invention, memory pool manager 110 is shared by all of web services applications 114A-F and can allocate data structures that are common among all of web services application 114A-F. Such data structures may include data structures for service status of printer/scanner/fax. Memory pool manager 110 can allocate data structures of a certain size. Memory pool manager 110 can also allocate data structures that are specific for MFP 104. In the case in which a dispatcher sits in front of all of web services applications 114A-F, memory pool manager 110 may even allocate a buffer to store network data. Each service type (e.g., printer/scanner/fax) of a web service application may also have a separate memory pool manager to process that web service application's specific data. Consequently, a device that hosts all of the services, and each type of service, which may have multiple instances of web services applications running, may have its own memory pool manager.

For example, web services application 114A might ask memory pool manager 110 to provide web services application 114A with a "print job status" type data structure. Different data structures may have different fields of different types, so data structures of some types might not be interchangeable with data structures of other types; a "print job status" type data structure might not be compatible with a "scanner job status" type data structure, for example. In response to the request, memory pool manager 110 might look in the shared memory pool to determine whether there is already a "print job status" type data structure allocated and currently marked "processed" (e.g., via a flag). Data structures so marked are not currently being used by any web services application. If memory pool manager 110 does locate a "print job status" type data structure in the memory pool, then memory pool manager 110 might provide that data structure (or a pointer thereto) to web services application 114A. Web services application 114A may then remove the "processed" indication from the data structure and overwrite the data currently in the data structure with whatever data that web services application 114A needs to put therein.

Alternatively, if memory pool manager 110 does not locate a "processed" "print job status" type data structure in the memory pool, then memory pool manager 110 might allocate a new "print job status" type data structure from free memory and provide that data structure (or a pointer thereto) to web services application 114A. Web services application 114A may populate and use the data structure, and, when web services application 114A is finished with the data structure, web services application 114A may give the data structure back to memory pool manager 110. If there are already at least a specified number of "print job status" type data structures in the shared memory pool, then memory pool manager 110 might free the memory that was allocated to the data structure. Otherwise, if there is a vacancy in the memory pool for another data structure of that type, then memory pool manager 110 might mark the data structure "processed" and place the data structure back into the shared memory pool for further use by web services application 114A or other web services applications.

In one embodiment of the invention, memory pool manager 110 only maintains a maximum of a specified number of allocated data structures in the shared memory pool for a particular type (or size) of data structure, and if the memory pool already contains the maximum number of allocated data structures of the particular type (or size), then memory pool manager 110 de-allocates and frees the memory of any data structure of that type (or size) that is returned to memory pool manager 110. For example, memory pool manager 110 might maintain a maximum of two of each type (or size) of data structure in the shared memory pool. For another example, memory pool manager 110 might maintain more of one type (or size) of data structure than of another type (or size) of data structure in the shared memory pool.

Although the embodiment of the invention discussed above involves a single memory pool manager 110 that manages a single shared memory pool that is used by all of web services application 114A-F, alternative embodiments of the invention may alternatively comprise multiple separate memory pool managers and multiple separate memory pools. In one embodiment of the invention, a separate memory pool and corresponding memory pool manager is provided for each different "type" (e.g., printer, scanner, etc.) of web services application; in such an embodiment of the invention, for example, printer web service application version A 114A and printer web service application version B 114B might both interact with a first memory pool manager but not a second memory pool manager, while scanner web service application version A 114C and scanner web service application version B 114D might interact with the second memory pool manager but not the first memory pool manager.

As is discussed above, in one embodiment of the invention, all data that is maintained by MFP 104 is classified as either cacheable data or non-cacheable data. Non-cacheable data is maintained in data structures that are taken from the shared memory pool as discussed above. However, in one embodiment of the invention, cacheable data is not stored in data structures that are taken from the shared memory pool. Instead, cacheable data is stored in data structures that are maintained in a local cache of the web services application that uses that data. Typically, such data will be data that does not change or changes only rarely. The specific kinds of data that are deemed to be cacheable may be configured by an installer or an administrator, for example.

In one embodiment of the invention, when one of web services applications 114A-F needs to store new cacheable data, that web services application 114 requests a "lifetime" data structure of the specified type from memory pool manager 110. In response, memory pool manager 110 allocates a data structure of that type from free memory and returns that data structure (or a pointer thereto) to the requesting web services application. The web services application populates the data structure and places that data structure in that web services application's cache. In one embodiment of the invention, memory pool manager 110 does not normally free the memory allocated to such a cached data structure. Thereafter, when the web services application needs to access the data stored in the data structure, the web services application accesses the data from the web services application's cache. In one embodiment of the invention, another type of "lifetime" data structure is used by event callbacks such as JobStatusEvent, which is generated by the platform down-level. That event callback data structure may also include data that is of a non-cacheable category. In one embodiment of the invention, when a web services application registers, to the abstract layer, the events of interest, the web services application requests, from memory pool manager 110, the data structures that will be used by event callback. The web services application passes these data structure to the abstract layer. In one embodiment of the invention, at the time that those events occur, the abstract layer fills the data structures that were passed by the web services application at registration time. Additionally, the abstract layer triggers the event callback. Some events may happen quite often. For example, in one embodiment of the invention, a JobStatusEvent occurs for each job processing state of all the jobs that are processed by the device (e.g., MFP 104). Having memory pool manager 110 maintain (e.g., by adding a flag) the list of relatively long "lifetime" data structures makes it possible and efficient for web services applications and the abstract layer to pass complicated data around. It also avoids lot of memory allocation/reallocation. In one embodiment of the invention, those data structures that are used for event callback will be released when the web services application un-registers the events to the abstract layer. In one embodiment of the invention, the data structures can also be used by non-event callback, by having memory pool manager 110 remove the corresponding flag. According to one embodiment of the invention, another way for the caller to obtain the cacheable data structure is to request that specific data type from memory pool manager 110 and keep hold of the retrieved data structure until the web services application quits.

In one embodiment of the invention, MFP 104 additionally comprises a resource manager 112, which redistributes memory and other resources among web services applications 114A-F in response to the occurrences of certain conditions. The operation of resource manager 112, according to one embodiment of the invention, is discussed in greater detail below.

Prioritized Resource Redistribution

In one embodiment of the invention, each data structure is assigned a priority by the web services application to which that resource belongs. For example, web services application 114A might assign, to a critical network communications buffer, a priority of "1," indicating a high priority, but web services application 114A might assign, to other data structures, lower priorities. In one embodiment of the invention, resource manager 112 periodically monitors the available, currently unused resources of MFP 104. If the available resources of MFP 104 drop below a specified threshold, then MFP 104 selects a set of low-priority data structures and frees the memory that is allocated to those data structures in order to bring the available resources of MFP 104 back above the threshold.

In an alternative embodiment of the invention, whenever resource manager 112 determines that the available resources of MFP 104 have fallen below the specified threshold, resource manager 112 selects, from among the currently allocated data structures, a set of one or more data structures that are occupying the most resources. Resource manager 112 asks the web services applications to whom those resources belong to free at least a portion of those data structures in order to bring the available resources of MFP 104 back above the threshold. For example, web services application 114A might be using a network communications buffer that occupies 64 kilobytes of memory—larger than any other data structure in use on MFP 104. In response to detecting a resource shortfall, resource manager 112 might ask web services application 114A to free 32 kilobytes of the memory that the network communications buffer occupies. Web services application 114A might free the requested memory and notify resource manager 112 that the memory has been freed as requested.

Example Resource Control Technique

Figure 2:
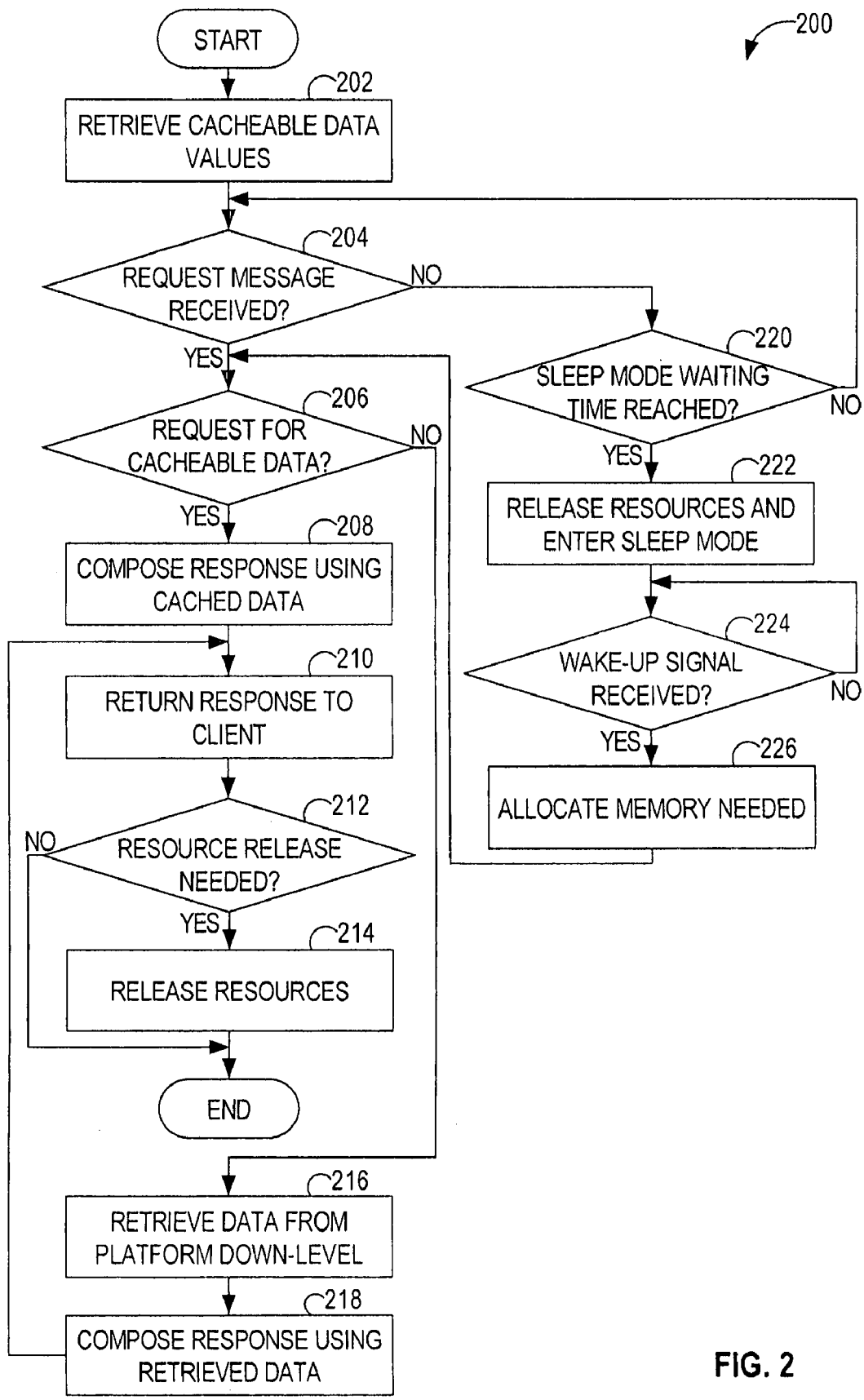
FIG. 2 is a flow diagram that illustrates a technique for controlling the resources that are used by web services application that execute on a device, according to an embodiment of the invention.

FIG. 2 is a flow diagram that illustrates a technique for controlling the resources that are used by web services application that execute on a device, according to an embodiment of the invention. Alternative embodiments may involve more, fewer, or different steps than those illustrated in FIG. 2.

In block 202, a web services application retrieves cacheable data values from a platform down-level. The platform down-level is the layer of MFP 104 that stores device-specific data, such as device model information and printer/scanner capability information. In one embodiment of the invention, rather than interacting directly with the platform down-level, the web services application interacts with an abstract layer that sits between the web services application and the platform down-level. The abstract layer handles data conversion and makes the web services application and the platform down-level transparent to each other. In one embodiment of the invention, the platform down-level is firmware. The web services application stores the cacheable data value in the web services application's cache.

In block 204, the web services application determines whether the web services application has received a request message of any kind (e.g., from client 102 or from some other component of MFP 104). During this time, the web services application may be running a timer that indicates how much time has passed since the last time that the web services application received any request (regardless of request type). If the web services application has received a request message, then control passes to block 206. Otherwise, control passes to block 220.

Under the circumstance that the web services application has received a request message, in block 206, the web services application determines whether the request is a request for cacheable data or non-cacheable data. If the request is for cacheable data, then control passes to block 208. Otherwise, control passes to block 216.

Under the circumstance that the request is for cacheable data, in block 208, the web services application composes a response to the request using the cached data in the web services application's cache. Control passes to block 210.

In block 210, the web services application returns the response to the entity from which the request was received (e.g., client 102). Control passes to block 212.

In block 212, memory resource manger 112 (or the web services application, if there is no resource manager on MFP 104) determines whether resources need to be released. For example, memory resource manager 112 may determine that resources need to be released in response to detecting that the free memory resources of MFP 104 have fallen below a specified threshold. If resources need to be released, then control passes to block 214. Otherwise, the technique described with reference to FIG. 2 is complete.

In block 214, memory resource manager 112 (or the web services application, if there is no resource manager on MFP 104) releases enough memory resources to return MFP 104 to a satisfactory condition. For example, memory resource manager 112 can free resources using the techniques described above in the section titled "PRIORITIZED RESOURCE REDISTRIBUTION." Memory resource manager 112 might free resources until the available memory resources of MFP 104 have risen back above a specified threshold, for example. The technique described with reference to FIG. 2 is then complete.

Alternatively, if the web services application determines in block 206 that the request is not for cacheable data (i.e., the request is for non-cacheable data), then in block 216, the web services application retrieves the data from the platform down-level. For example, the web services application may populate a data structure requested from memory pool manager 110 with such retrieved data. Control passes to block 218.

In block 218, the web services application composes a response to the request using the data retrieved in block 216. Control passes back to block 210.

Alternatively, if the web services application determines in block 204 that the web services application has not received a request message, then in block 220, the web services application determines whether a specified amount of time, called the "sleep mode waiting time," has passed since the last time that the web services application received a request message. For example, the "sleep mode waiting time" might be ten minutes. If the sleep mode waiting time has been reached, then control passes to block 222. Otherwise, control passes back to block 204, in which the web services application continues to wait for a request message. According to an embodiment of the invention, the web services application itself, rather than any other managing application, detects the need for the web services application to enter sleep mode.

In block 222, the web services application releases at least a portion of the web services application's resources. For example, the web services application might free all of the memory of all of the data structures that the web services application was using. The freed memory becomes available to other, more active web services applications. Additionally, the web services application enters "sleep mode," in which the web services application uses minimal processing resources of MFP 104. In one embodiment of the invention, while in sleep mode, the web services application only uses the processing resources of MFP 104 to perform the determination of block 224 (discussed below). According to an embodiment of the invention, the web services application itself, rather than some other managing application, frees resources (e.g., by notifying memory pool manager 110 to release the resources) before entering sleep mode. Thus, the web services application exhibits "self control."

In one embodiment of the invention, each of web services applications 114A-F has one or more IP addresses and/or one or more TCP ports that are assigned to that web services application. Web services applications 114A-F use these IP addresses and TCP ports to communicate with client 102. In one embodiment of the invention, a dispatcher module sits between client 102 and web services applications 114A-F on MFP 104. In such an embodiment, when a web services application enters "sleep mode" in block 222, the web services application additionally releases the application's IP addresses and/or TCP ports to the dispatcher module, which may redistribute those addresses and/or ports to other, more active web services applications. When the web services application exits "sleep mode" (as is discussed below), the dispatcher module may re-assign IP addresses and/or TCP ports (potentially different from the originals) to the awakened web services application.

In block 224, the web services application (now in "sleep mode") determines whether the web services application has received a "wake-up" signal. Such a "wake-up" signal may be received, for example, when the web services application receives a request from client 102 or from some other entity. If the web services application has received a "wake-up" signal, then control passes to block 226. Otherwise, control passes back to block 224, and the web services application continues to sleep.

In block 226, the web services application exits "sleep mode" and re-allocates at least the minimum set of resources (e.g., memory) that the web services application needs to operate (e.g., to respond to a web services request). Control passes to block 206.

Certain embodiments of the invention discussed above beneficially enable more flexibility in device resource management systems without affecting web services' seamless communication. Certain embodiments of the invention beneficially allow a greater quantity of web services application to execute on a device with very limited resources, such as an embedded-system device or a low-end device.

Implementation Mechanisms

Figure 3:
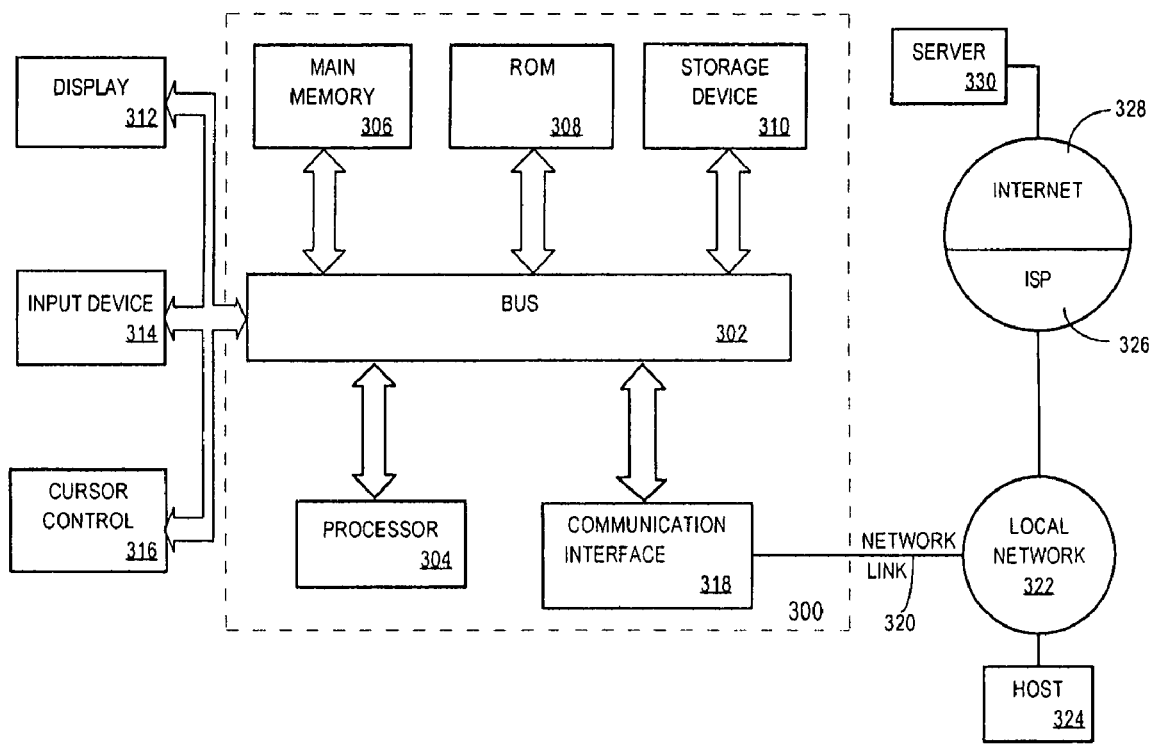
FIG. 3 is a block diagram that depicts a printing device upon which an embodiment of the invention may be implemented.

FIG. 3 is a block diagram that depicts a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a liquid crystal display (LCD), for displaying information to a user. An input device 314 including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 in a wireless communications architecture. According to one embodiment of the invention, wireless communications are provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a LAN card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the Internet 328. Local network 322 and Internet 328 both use electrical, electromagnetic or optical signals that carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application performs one or more techniques described herein. Processor 304 may execute the received code as it is received and/or stored in storage device 310 or other non-volatile storage for later execution.

In the foregoing specification, specific embodiments of the invention have been described. However, various modifications and changes may be made to such embodiments of the invention without departing from the broader spirit and scope of the invention. The specification and drawings are, accordingly, to be regarded in an illustrative rather than a restrictive sense.

What is claimed is:

1. A computer-implemented method for managing a web services application, the method comprising:
    a particular web services application determining that first data is cacheable data due to the first data being at least one of: (a) a manufacturer of a device on which the particular web services application executes, (b) a model of said device, (c) a list of capabilities of said device, (d) a physical location of said device, (e) a default print ticket, or (f) a default scan ticket;
    in response to determining that the first data is cacheable data, the particular web services application (1) requesting, from a memory pool manager resident on said device, a first data structure of a kind whose memory the memory pool manager does not free, (2) populating said first data structure with said first data, and (3) inserting the populated first data structure into a cache that is accessible by said particular web services application but no other web services application executing said device;
    said particular web services application determining that second data is not cacheable due to the second data not being at least one of: (a) the manufacturer of a device on which the particular web services application executes, (b) the model of said device, (c) the list of capabilities of said device, (d) the physical location of said device, (e) the default print ticket, or (f) the default scan ticket;
    in response to determining that the second data is not cacheable data, the particular web services application requesting, from said memory pool manager, a second data structure that was returned to a memory pool after being used by another web services application executing on said device, and populating said second data structure with said second data without ever inserting said second data structure into said cache;
    receiving, at the particular web services application, a request for particular data;
    in response to receiving the request for the particular data, the particular web services application determining whether the particular data is contained in the cache of the particular web services application; and
    in response to the particular web services application determining that the particular data is contained in the cache, the particular web services application responding to the request with the particular data that is contained in the cache;
    wherein the method is performed by one or more computing devices.

2. The method of claim 1, wherein the particular web services application executes on an image-forming device.

3. The method of claim 1, further comprising:
    determining whether a specified amount of time has passed since a last time that the particular web services application has received a message;
    in response to determining that the specified amount of time has passed since the last time, causing the particular web services application to free at least a portion of memory that is allocated to one or more data structures that the particular web services application uses that are not in the cache, thereby making the portion of memory available to one or more other web services applications;
    in response to determining that the specified amount of time has passed since the last time, causing the particular web services application to enter a sleep mode in which the particular web services application remains idle until the particular web services application receives a signal.

4. The method of claim 3, further comprising:
    determining whether the particular web services application has received the signal; and
    in response to determining that the particular web services application has received the signal, (a) causing the particular web services application to exit the sleep mode and (b) causing the particular web services application to allocate memory for one or more data structures.

5. The method of claim 1, further comprising:
    determining whether free memory resources of the device on which the particular web services application executes have fallen below a specified threshold; and
    in response to determining that the free memory resources of the device have fallen below the specified threshold, freeing at least a portion of memory that is occupied by data structures that are used by the particular web services application at least in part by selecting data structures that are not in the cache rather than data structures that are in the cache.

6. The method of claim 5, wherein the step of freeing the portion of memory comprises:
    determining one or more data structures that have been assigned a lowest priority among priorities assigned to data structures that are used by the particular web services application; and
    freeing memory that is occupied by the one or more data structures that have been assigned the lowest priority without freeing memory that is occupied by other data structures that are used by the particular web services application.

7. The method of claim 5, wherein the step of freeing the portion of memory comprises:
    selecting, from among a set of data structures that are being used by a plurality of web services applications, a particular data structure that is occupying a largest amount of memory among the set of data structures that are not in the cache;

determining which web services application of the plurality of web services applications is using the particular data structure; and in response to determining that the particular web services application is using the particular data structure, asking the particular web services application to free at least a portion of memory that the particular data structure occupies.

8. The method of claim 1, further comprising:

the memory pool manager receiving, from the particular web services application, a request for a data structure of a particular type;

the memory pool manager determining whether a memory pool currently contains an allocated data structure that is (a) of the particular type and (b) not currently being used by any web services application; and in response to determining that the memory pool currently contains a particular allocated data structure that is (a) of the particular type and (b) not currently being used by any web services application, the memory pool manager returning the particular allocated data structure to the particular web services application.

9. The method of claim 1, further comprising:

the memory pool manager receiving, from the particular web services application, a request for a data structure of a particular type;

the memory pool manager determining whether a memory pool currently contains an allocated data structure that is (a) of the particular type and (b) not currently being used by any web services application; and in response to determining that the memory pool does not currently contain an allocated data structure that is (a) of the particular type and (b) not currently being used by any web services application, the memory pool manager allocating, from free memory, a particular data structure that is of the particular type and returning the particular data structure to the particular web services application.

10. A non-transitory computer-readable medium carrying one or more sequences of instructions, wherein execution of the one or more sequences of instructions by one or more processors causes the one or more processors to perform the steps of:

a particular web services application determining that first data is cacheable data due to the first data being inserting, into a cache of a particular web services application, metadata indicating at least one of: (a) a manufacturer of a device on which the particular web services application executes, (b) a model of said device, (c) a list of capabilities of said device, (d) a physical location of said device, (e) a default print ticket, or (f) a default scan ticket;

in response to determining that the first data is cacheable data, the particular web services application (1) requesting, from a memory pool manager resident on said device, a first data structure of a kind whose memory the memory pool manager does not free, (2) populating said first data structure with said first data, and (3) inserting the populated first data structure into a cache that is accessible by said particular web services application but no other web services application executing said device;

said particular web services application determining that second data is not cacheable due to the second data not being at least one of: (a) the manufacturer of a device on which the particular web services application executes, (b) the model of said device, (c) the list of capabilities of said device, (d) the physical location of said device, (e) the default print ticket, or (f) the default scan ticket;

in response to determining that the second data is not cacheable data, the particular web services application requesting, from said memory pool manager, a second data structure that was returned to a memory pool after being used by another web services application executing on said device, and populating said second data structure with said second data without ever inserting said second data structure into said cache;

receiving, at the particular web services application, a request for particular data; in response to receiving the request for particular data, the particular web services application determining whether the particular data is contained in the cache of the particular web services application; and in response to the particular web services application determining that the particular data is contained in the cache, the particular web services application responding to the request with the particular data that is contained in the cache.

11. The computer-readable medium of claim 10, wherein the particular web services application executes on an image-forming device.

12. The computer-readable medium of claim 10, wherein the steps further comprise:

determining whether a specified amount of time has passed since a last time that the particular web services application has received a message;

in response to determining that the specified amount of time has passed since the last time, causing the particular web services application to free at least a portion of memory that is allocated to one or more data structures that the particular web services application uses, thereby making the portion of memory available to one or more other web services applications;

in response to determining that the specified amount of time has passed since the last time, causing the particular web services application to enter a sleep mode in which the particular web services application remains idle until the particular web services application receives a signal.

13. The computer-readable medium of claim 12, wherein the steps further comprise:

determining whether the particular web services application has received the signal; and in response to determining that the particular web services application has received the signal, (a) causing the particular web services application to exit the sleep mode and (b) causing the particular web services application to allocate memory for one or more data structures.

14. The computer-readable medium of claim 10, wherein the steps further comprise:

determining whether free memory resources of a device on which the particular web services application executes have fallen below a specified threshold; and in response to determining that the free memory resources of the device have fallen below the specified threshold, freeing at least a portion of memory that is occupied by data structures that are used by the particular web services application.

15. The computer-readable medium of claim 14, wherein the step of freeing the portion of memory comprises:

determining one or more data structures that have been assigned a lowest priority among priorities assigned to data structures that are used by the particular web services application; and freeing memory that is occupied by the one or more data structures that have been assigned the lowest priority without freeing memory that is occupied by other data structures that are used by the particular web services application.

16. The computer-readable medium of claim 14, wherein the step of freeing the portion of memory comprises:

selecting, from among a set of data structures that are being used by a plurality of web services applications, a particular data structure that is occupying a largest amount of memory among the set of data structures;

determining which web services application of the plurality of web services applications is using the particular data structure; and in response to determining that the particular web services application is using the particular data structure, asking the particular web services application to free at least a portion of memory that the particular data structure occupies.

17. The computer-readable medium of claim 10, wherein the steps further comprise:

the memory pool manager receiving, from the particular web services application, a request for a data structure of a particular type;

the memory pool manager determining whether a memory pool currently contains an allocated data structure that is (a) of the particular type and (b) not currently being used by any web services application; and in response to determining that the memory pool currently contains a particular allocated data structure that is (a) of the particular type and (b) not currently being used by any web services application, the memory pool manager returning the particular allocated data structure to the particular web services application.

18. The computer-readable medium of claim 10, wherein the steps further comprise:

the memory pool manager receiving, from the particular web services application, a request for a data structure of a particular type;

the memory pool manager determining whether a memory pool currently contains an allocated data structure that is (a) of the particular type and (b) not currently being used by any web services application; and in response to determining that the memory pool does not currently contain an allocated data structure that is (a) of the particular type and (b) not currently being used by any web services application, the memory pool manager allocating, from free memory, a particular data structure that is of the particular type and returning the particular data structure to the particular web services application.

* * * * *